March 29, 1955  J. L. HAMILTON ET AL  2,704,883
METHOD OF WELDING CARBON STEEL TO STAINLESS STEEL
Filed Feb. 18, 1952
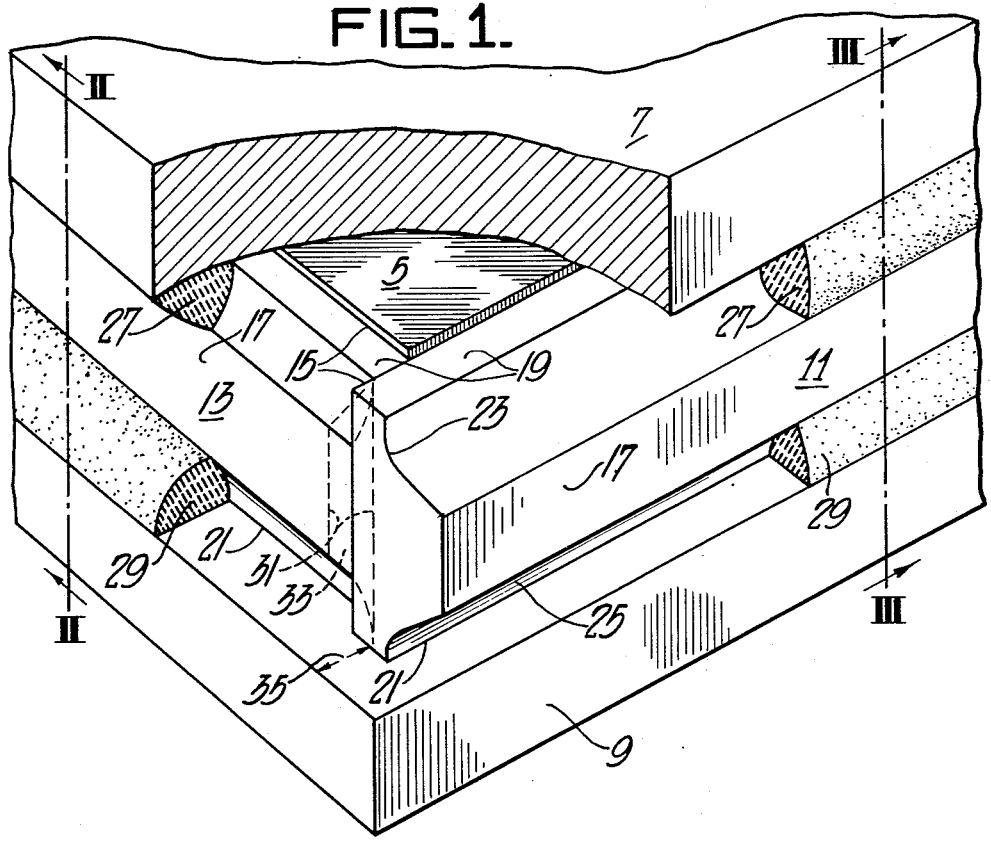
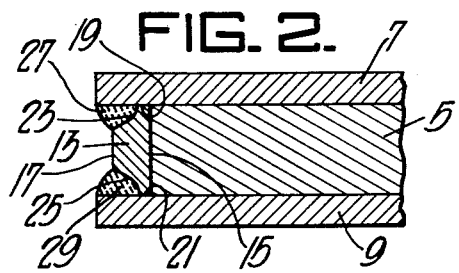
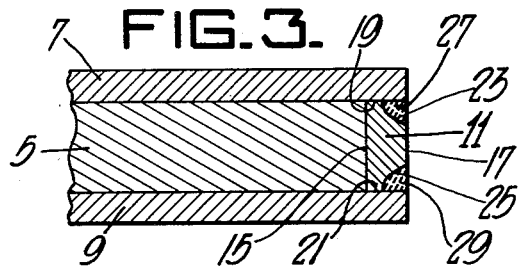
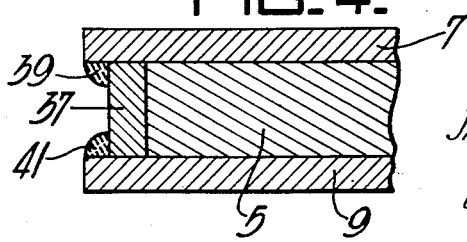
*Inventors:*
JACK L. HAMILTON, MATTI H. PAKKALA
and RAYMOND SMITH,
by: Donald G. Dalton
their Attorney.

2,704,883

METHOD OF WELDING CARBON STEEL TO STAINLESS STEEL

Jack L. Hamilton, Matti H. Pakkala, and Raymond Smith, Pittsburgh, Pa., assignors to United States Steel Corporation, a corporation of New Jersey Application February 18, 1952, Serial No. 272,054

2 Claims. (Cl. 29—471.5)

This invention relates to the treatment of plain carbon steel to render the surface readily weldable to a cladding layer such as stainless steel and also to inhibit atmospheric corrosion. The invention has special utility in the manufacture of clad sheet metal comprising, for example, a base of plain carbon steel and a surface layer of stainless steel.

This is a continuation-in-part of our application Serial No. 695,208 filed September 6, 1946, now abandoned, for "Process of Making Bimetallic Bodies."

It is desirable for many purposes to use composite sheet material, e. g., carbon steel having a cladding layer of corrosion-resistant metal such as stainless steel thereon. Cooking utensils fabricated from such material have the advantage of greater heat conductivity as compared with solid stainless steel. It has been proposed to produce this material by welding a plate of stainless steel to a base of carbon steel of substantially the same dimensions, along the edges thereof, heating the resulting composite slab to rolling temperature and rolling it in order to weld the plate and base together throughout their contacting surfaces and reduce the slab to sheet thickness. Difficulty has been experienced, however, in securing the desired bond between the base and cladding layer, even though extreme care be used in cleaning the surface of the base which comes in contact with the plate of cladding metal and in the edge welding. For example, in one instance, the surface of the base was machined all over to a substantial depth, i. e., .125 inch, a stainless-steel plate superposed thereon and edge welded thereto but when the combination was heated to a temperature sufficiently high to cause welding, and then rolled the cladding layer separated from the base. Normal acid pickling of the base is likewise ineffective to cause welding of the cladding layer to the base when superposed thereon, edge welded thereto and rolled at the proper temperature.

We have invented a method of treating the base of carbon steel so that the cladding layer is fully and firmly bonded thereto, when the composite slab is heated and rolled. In a preferred practice, we descale the surfaces of the base and the cladding plate which will be in contact, by any convenient known means. We then subject the clean surface of the carbon-steel base to the action of dilute nitric acid for a short time. The effect of this treatment on the clean surface of the base metal is to condition it so that it will make a good bond with the cladding layer when the latter is superposed thereon and the resulting composite slab is heated and rolled. A further effect of the treatment is to protect the carbon steel from atmospheric oxidation for a long time.

A complete understanding of the invention may be obtained from the following detailed description and explanation of the preferred practice for cladding a low-carbon steel base with a surface layer of stainless steel, which refer to the accompanying drawings illustrating the preferred assembly of plates forming a composite slab ready for heating and rolling. In the drawings, Figure 1 represents a fragmentary isometric view of a composite slab formed in accordance with the technique of the present invention, parts being broken away for clarity;

Figure 2 is a partial section taken on the plane of line II—II of Figure 1;

Figure 3 is a further sectional view taken on the plane of line III—III of Figure 1; and Figure 4 is a view similar to Figure 2 showing a slight modification.

The principal steps of the present process are: (a) assembling plates of low-carbon and stainless steel which have been treated to render their surfaces in a high state of cleanliness, (b) safe-guarding this cleanliness prior to and during heating by welding the entire periphery of the assemblage to provide an air-tight seal excluding the exterior atmosphere from the surfaces to be bonded, and (c) rolling the welded plate assembly as a composite slab to effect the bonding of the plates and to reduce the slab to the desired dimensions.

In a preferred practice, we first descale the stainless-steel and carbon-steel plates by grit blasting or by the conventional practice of immersion in a fused-salt bath (NaOH+NaH). Of the two, the latter is preferred. Thorough initial descaling is desirable to reduce the time of the subsequent sulphuric-acid pickle or eliminate it altogether, thus avoiding any difficulty incident to occluded hydrogen.

The procedure for finally cleaning the stainless steel which has been found best in practice is pickling in an aqueous solution of sulphuric acid of from 10 to 20% concentration held at a temperature from 140° F. to 180° F., followed by pickling in an aqueous solution of nitric acid of from 8 to 10% concentration to which 2% of hydrofluoric acid had been added, held at a temperature of from 130° F. to 180° F. It is possible to obtain a surface free from scale and smudge by repeating the foregoing treatment but an aqueous solution of potassium permanganate and caustic soda (5% potassium permanganate with from 15 to 20% of caustic soda) may be employed at a temperature of from 180° to 200° F., when the condition of the steel surface makes it necessary. The pickled steel is then washed and dried, in a conventional manner. If the resulting chemically clean stainless steel becomes soiled in handling, the metal may be recleaned by brushing with hot water and trisodium phosphate.

After the initial descaling, the low-carbon steel is pickled, if necessary, in an uninhibited aqueous solution of sulphuric acid of from 7 to 10% concentration at a temperature of from 140 to 180° F. although this may be omitted. The low-carbon steel is then immersed for approximately one minute in an aqueous solution of nitric acid of from 6 to 10% concentration, held at a temperature of from 140 to 180° F. It is then thoroughly scrubbed under water or sprays, and dried in air. A higher concentration of nitric acid may be used with very good results. The drying must be completed as soon as possible after exposing the plates to the air. Carbon steel treated in this manner has the appearance of stainless steel, and does not discolor by becoming brownish on storage.

The cleaning steps of the invention may be carried out in accordance with the following illustrative example, although variations from the procedure specifically described may be resorted to without departing from the spirit or substance of the invention.

In accordance with this example, 18–8 chrome-nickel stainless-steel plates measuring 38 inches by 70 inches by 0.7 inch thick, are initially descaled as described above, then pickled in a 10% sulphuric acid held at 140° F., repickled in an 8% nitric acid-2% hydrofluoric acid solution at 140° F., washed and dried. Low-carbon steel slabs 2.10 inches thick and of substantially the same width and length as the stainless steel plates are initially descaled as described and then pickled in 10% sulphuric acid maintained at about 180° F. until all the scale is removed. The slabs are then immersed in 10% nitric acid held at 180° F. for about one minute, then scrubbed vigorously under water or sprays and dried. The immersion in nitric acid may be longer if the action is slow because of contamination of the bath by usage. The metal should not be allowed to dry before the scrubbing action has removed all traces of smudge. An alternative to the scrubbing procedure which may be used to remove smudge after the nitric-acid dip is the immersion in a 2% aqueous solution of muriatic acid at a temperature from 180 to 190° F., followed by removal, washing with water and drying in air.

The resulting chemically cleaned carbon-steel slab is enclosed on both sides by the stainless-steel plates in a special manner which will now be explained by reference to the drawings.

In accordance with the preferred procedure, the carbon-steel slab 5 is interposed between the stainless-steel plates 7 and 9 which overhang the carbon steel slab on all sides, as shown. It is preferable, but not necessary, for the stainless-steel plates to extend beyond the carbon-steel slab at the front and rear ends by about one-half the thickness of the composite slab. No such extension is necessary at the sides of the slab. Carbon-steel filler bars 11 and 13 are interposed between the overhanging edges of the stainless-steel plates, these bars having opposite substantially plane surfaces 15 and 17, and substantially plane edge portions 19 and 21. The bars 11 and 13 fully cover the edges of the carbon-steel slab 5, and have their outer surfaces substantially flush with the sides of the stainless-steel plates 7 and 9 and their surfaces 15 abutting the edges of slab 5. The edges of the bars 11 and 13 are recessed to provide V-grooves 23, 25, which are filled with weld metal to form fillet welds 27, 29, for joining the assembled pack together. Contiguous ends of the carbon-steel bars also are provided with similar V-grooves, shown at 31 for the same purpose, the grooves 23, 25, and 31 serving as anchors for the fillet welds 27, 29 and 33. These fillet welds are built up until substantially flush with the outer face of the insert bars and with the stainless-steel slabs, a small overhang lip portion 35 being left at the corners of the pack to permit crimping down of the stainless steel slabs for facilitating entry thereof into the rolls. When the pack is hot rolled, the filler bars become integral parts of the plain carbon steel core that is clad on both sides with stainless steel.

Any welding technique may be employed for producing the welds, such as electric arc-welding, using stainless-steel electrodes. Rectangular filler bars 37 also may be used, as indicated on Figure 4, the corners between the bars 37 and the overhanging edges of the stainless-steel plates being provided with welds as indicated at 39, 41, which unite the elements of the pack. It will be understood that the bars 37 are inserted between the stainless-steel plates 7 and 9 around all sides and edges of the carbon-steel slab 5, so as to enclose the latter fully.

The resulting weldments are placed in a conventional slab-heating furnace and heated gradually to 2200° F. at the center, at a heating rate permitting this temperature to be reached, starting from room temperature, within from 3 to 4 hours. On reaching approximately 2200° F., the welded composite slabs are soaked to obtain uniformity of temperature and rolled down to the desired size. To insure proper rolling, the slabs may be heated to a slightly higher temperature, i. e., approximately 2300° or even 2350° F. The stainless-steel plates 7 and 9 are free to expand independently of the slab 5. This is important because the plates come up to temperature considerably ahead of the slab 5.

Metallographic investigation and mechanical testing have demonstrated the soundness of the bond produced by the practice of the present invention. No non-metallic boundary line has ben found in the majority of the specimens examined. Atomic penetration is adequate and is not affected by an occasional presence of oxides. Tensile characteristics of the bond exceed those of the carbon-steel component. This is attributed tentatively to the diffusion of elements from the stainless steel into the carbon-steel component.

The finished clad sheets and plates produced by the process of the present invention readily meet conventional industrial requirements, provided that the surface preparation has been properly carried out.

While the above example refers particularly to austenitic 18-8 chrome-nickel stainless steel which represents the most common application of the process, the invention is fully effective in connection with straight chromium stainless steels, or with stainless steels characterized by increased chromium and nickel contents, as well as by the presence of other alloying elements.

The carbon steel used as the base of the composite stock produced in accordance with this invention is low in carbon, i. e., less than .1%. Since the heating of the slab to a temperature of around 2200° F. for rolling is a prerequisite of the process, there is a possibility of carbon migration into the stainless steel cladding which might lead to the improverishment of the chromium in the stainless steel through chromium carbide precipitation, under proper conditions, thus favoring subsequent intercrystalline corrosion. In many fields of use, however, the danger of intercrystalline corrosion is remote. It is preferred nevertheless in practice, to limit the carbon content of the steel used for the base to 0.1% maximum, the optimum range being substantially 0.03% to substantially 0.08%. A further improvement is attained when the stainless steel used for the cladding layers of the finished product is stabilized in a known manner.

Clean freshly pickled stainless steel plates upon exposure to the atmosphere become passive in a relatively short period of time. This passive oxide film which forms upon exposure to the atmosphere has long been recognized as the cause for failure of stainless steels to hammerweld. Our nitric-acid treatment on the scale-free carbon steel imparts to the surface a protective film which at the rolling temperature reacts with and destroys the passive oxide film of the stainless steel thus creating an active surface on the stainless steel which permits bonding to the carbon-steel component upon hot rolling.

We are aware that it has been proposed to pickle stainless steel by successive immersions in hot dilute sulphuric-acid baths with an intermediate immersion in a hot dilute caustic bath, the second immersion in sulphuric acid being followed by immersion in a bath of dilute nitric acid containing a small amount of hydrofluoric acid. Such strong pickling action is necessary, of course, in the case of stainless steel because of its high resistance to acids. Low-carbon steel, on the other hand, is readily attacked by most acids and the action is accelerated if the metal surface be made clean initially. The use of such an active acid as nitric, even though dilute, on such susceptible material as clean low-carbon steel, therefore, does not produce a pickling action in the usual sense of the word, since the metal is already clean, and is a matter quite different from the use of dilute nitric acid for the final pickling of stainless steel.

We believe that our method results in the deposition of a layer formed by a chemical union between the nitrite or nitride ion and the base metal. This deposition occurs subsequent to cleaning. No matter how much cleaning may be done by shot blasting, grinding, or machining, unless this layer is deposited, a successful bond between base metal and cladding metal is not obtained. Upon subsequent heating in contact with the stainless components, the layer deposited on the base metal reduces the oxide film of the stainless steel and makes bonding possible. Because of the observed outstanding corrosion resistance of the treated carbon-steel parts, the presence of a special layer cannot be questioned. In contrast to this, etching is a preferential attack by acid usually considered deleterious to corrosion resistance.

While the preferred manner of practicing the invention has been outlined above, it will be understood that the details of the specifically-described procedure may be varied without departing from the inventive concept, as particular circumstances may require. Accordingly, it will be understood that it is intended and desired to embrace within the scope of the invention such modifications and changes as may be necessary to adapt it to varying conditions and uses, as defined by the appended claims.

We claim:

1. In the manufacture of clad metal composed of a base of plain carbon steel and a surface layer of stainless steel welded thereto, the steps including first removing substantially all the scale from the surface of the plain carbon steel base, then subjecting the resulting scale-free surface to the action of nitric acid of a concentration from 6 to 10% at a temperature from 140° to 180° F. for about a minute thereby rendering the surface resistant to oxidation and putting it in a state favoring the formation of a permanent bond between the base and cladding layer, then, before the base dries, removing all traces of smudge formed thereon, washing the base with water and immediately drying it, removing the scale from the surface of a stainless steel cladding piece then superposing on said base the cladding piece of stainless steel with the cleaned surfaces in abutting relationship, heating the base and cladding to welding temperature, and hot-rolling them to weld them together.

2. In the manufacture of clad metal composed of a base of plain carbon steel between two surface layers of stainless steel welded thereto, the steps including first removing substantially all the scale from the surface of the plain carbon steel base, then subjecting the resulting scale-free surface to the action of nitric acid of a concentration from 6 to 10% at a temperature from 140° to 180° F. for about a minute thereby rendering the surface resistant to oxidation and putting it in a state favoring the formation of a permanent bond between the base and cladding layer, then, before the base dries, removing all traces of smudge formed thereon, washing the base with water and immediately drying it, removing the scale from the surface of two stainless steel cladding pieces, then placing the base between the two cladding pieces with the cleaned surfaces in abutting relationship, placing filler bars around the plain carbon steel base and welding the filler bars to the cladding pieces so as to enclose the base fully, heating the base and cladding pieces to welding temperature, and hot-rolling them to weld them together.

References Cited in the file of this patent

UNITED STATES PATENTS

| Number | Name | Date |
|---|---|---|
| 1,351,824 | Worthington | Sept. 7, 1920 |
| 1,549,022 | Otte | Aug. 11, 1925 |
| 1,859,734 | George | May 24, 1932 |
| 1,902,815 | Goodhue | Mar. 28, 1933 |
| 2,347,742 | Keene | May 2, 1944 |
| 2,368,955 | Weesner et al. | Feb. 6, 1945 |
| 2,374,356 | Keuffel et al. | Apr. 24, 1945 |
| 2,411,532 | Escoffery | Nov. 26, 1946 |
| 2,569,158 | Francis | Sept. 25, 1951 |

OTHER REFERENCES

Metals Handbook published by the A. S. M., 1939 edition, pages 722 and 728.